United States Patent [19]
Demers

[11] Patent Number: 5,879,632
[45] Date of Patent: Mar. 9, 1999

[54] APPORTIONING SYSTEM

[75] Inventor: Robert Richard Demers, Cranbury, N.J.

[73] Assignee: Sarnoff Corporation, Princeton, N.J.

[21] Appl. No.: 630,047

[22] Filed: Apr. 9, 1996

[51] Int. Cl.[6] .............................. F17D 1/14; B01L 3/00; C25B 15/08
[52] U.S. Cl. ...................... 422/100; 137/487.5; 137/551; 137/597; 204/269; 204/450; 204/600
[58] Field of Search ............................. 422/100; 204/269, 204/450, 600; 137/487.5, 551, 597

[56] References Cited

U.S. PATENT DOCUMENTS

| | | | |
|---|---|---|---|
| 4,676,274 | 6/1987 | Brown | 137/806 |
| 4,908,112 | 3/1990 | Pace | 204/299 |
| 4,966,646 | 10/1990 | Zdeblick | 156/633 |
| 5,180,288 | 1/1993 | Richter et al. | 417/48 |
| 5,296,114 | 3/1994 | Manz | 204/180 |
| 5,320,139 | 6/1994 | Paul et al. | 137/567 |
| 5,462,839 | 10/1995 | de Rooij et al. | 430/320 |
| 5,480,614 | 1/1996 | Kamahori | 422/70 |
| 5,603,351 | 2/1997 | Cherukuri et al. | 137/597 |

FOREIGN PATENT DOCUMENTS

| | | |
|---|---|---|
| 4438785 | 5/1996 | Germany . |
| 9642004 | 12/1996 | WIPO . |

OTHER PUBLICATIONS

M. Deml et al. *J. Chromatog.* 1985, 320, 159–165.
G. Fuhr et al. *J. Micromech. Microeng.* 1994, 4, 217–226.
Woolley et al., Ultra–High–Speed DNA Fragment Separations Using Microfabricated Capillary Array Electrophoresis Chips, *Proc. Natl. Acad. Sci. USA*, 91:11348–11352, Nov. 1994.
Dasgupta et al., Electroosmosis: A Reliable Fluid Propulsion System for Flow Injection Analysis, *Anal. Chem.*, 66:1792–1798, 1994.
Harmon et al., Selectivity in Electrophoretically Mediated Microanalysis by Control of Product Detection Time, *Anal. Chem.*, 66:3797–3805, 1994.
Patterson, et al., Electrophoretically Mediated Microanalysis of Calcium, *Journal of Chromatography*, A662:389–395, 1994.
Microfabricated Device is Chemistry Lab on a Chip, *Chemical and Engineering News*.
Harmon, et al., Mathematical Treatment of Electrophoretically Mediated Microanalysis, *Anal. Chem.*, 65:2655–2662, 1993.
Richeter et al., A Micromachined Electrohydrodynamic (EHD) Pump, *Sensors and Actuators*, A29:159–168, 1992.
Bart et al., Microfabricated Electrohydrodynamic Pumps, *Sensors and Actuators*, A21–A23:193–197, 1990.
Melcher, Traveling–Wave Induced Electroconvection, *The Physics of Fluids*, 9:1548–1555, 1966.
Pickard, Ion Drag Pumping. I. Theory, *J. Applied Physics*, 34:246–250, 1963.
Pickard, Ion Drag Pumping. II. Experiment, *J. Applied Physics*, 34:251–258, 1963.
Stuetzer, Ion Drag Pumps, *J. Applied Physics*, 31:136–146, 1960.
Megregany, Microelectromechanical Systems, *Circuits and Devices*, Jul. 1993.
Fisher, Microchips for Drug Compounds, *New York Times*, Mar. 3, 1991.
The Silver Shotguns, *The Economist*, Dec. 14–20, 1991.
Manz et al., *Trends in Analytical Chemistry*, 10(5):144–148 (1991).

*Primary Examiner*—Arlen Soderquist
*Attorney, Agent, or Firm*—William J. Burke

[57] ABSTRACT

The invention provides an apportioning system comprising a first apportioning chamber having a first outlet and fillable with liquid to a first defined level such that if liquid is added to fill the first apportioning chamber above the first defined level, then the extra fluid drains through the first outlet, an inlet channel that distributes liquid to the first apportioning chamber, and a first electrode-based pump for moving liquid in the first apportioning chamber out the first outlet.

15 Claims, 6 Drawing Sheets

APPORTIONING SYSTEM

The present invention relates to a system for distributing a fluid to each of a number of reaction wells, which are preferably of small dimensions, using an apportioning system. Preferably, a cassette containing a number of such apportioning systems is used to transfer fluids to one or more plates containing a plurality of reaction wells.

Recent advances in microfluidics, i.e., the small-scale transfer of liquid among compartments, have made it possible to conduct reactions such as syntheses or assays in very small-scale devices. See, for instance, Zanzucchi et al., "Liquid Distribution System," U.S. patent application Ser. No. 08/556,036, filed Nov. 9, 1995. This advance, however, out-paces the methodologies such as robotics that have been developed for apportioning liquids into, for instance, the wells of 96 well and 384 well plates. Some of the liquid apportioning needs created by the microfluidics advance can be met using the very same microfluidic devices that define the recent advances. However, there are circumstances that are not sufficiently addressed with such microfluidic devices. One such circumstance is where a soluble or suspendable material has been formed in or is stored in a small-scale reaction well and it would prove useful to transfer prescribed amounts of that material to two or more different reaction wells. The present invention meets that need with a device and method that emphasizes fluidics, i.e., the pumping of fluid among wells, chambers and channels, more so than mechanical processes.

The prior art typically uses robotics to dip multiple needle projections into wells of source liquid and then to attempt to drawn up defined quantities of liquid into each of the projections. The needle projections are then mechanically moved to another set of wells and the liquid dispensed. By the present invention, it is possible to bring an apportionment cassette containing multiple apportioning systems of the invention underneath a source tray containing the wells that contain the liquid to be apportioned. Using electrode-based pumps associated with the source tray, liquid is transferred from all or a subset of the wells into a number of apportioning systems of the invention, each such apportioning system having one or more chambers that are filled through the transfer. A receiving tray having wells into which fluid is to be aliquoted is then brought underneath the apportionment cassette and electrode-based pumps in the apportioning systems are used to pump quantities of liquid from the apportioning systems into wells in the receiving tray. The receiving tray is preferably designed to reversibly attach to a microfluidics device such as one described in Zanzucchi et al., "Liquid Distribution System," U.S. patent application Ser. No. 08/556,036, filed Nov. 9, 1995. The microfluidic device can then be used, for instance, to draw appropriate reagents into the receiving tray for conducting an assay for the presence of a biological activity in the liquid that was aliquoted into the receiving tray using the apportionment cassette.

Some mechanical operations are incorporated in the operations described above. However, those mechanical operations involve moving a source tray having defined dimensions and a defined arrangement of wells in relation to an apportionment cassette designed to dock with the source tray to properly align the wells with apportioning systems in the apportionment cassette. The apportionment cassette is then aligned with the receiving tray and aliquots are dispensed into the receiving tray using electrode-based pumps. In this way, only two limited mechanical motions are required, in contrast to the multiple motions and alignments needed with a typical mechanical device. Because of the simplicity of the mechanical operations used with the invention, the devices used in conjunction with the invention can be much simpler mechanically and consume much less space. The limited mechanical operations of the invention also save time.

SUMMARY OF THE INVENTION

The invention provides an apportioning system comprising a first apportioning chamber having a first outlet and fillable with liquid to a first defined level such that if liquid is added to fill the first apportioning chamber above the first defined level, then the extra fluid drains through the first outlet, an inlet channel that distributes liquid to the first apportioning chamber, and a first electrode-based pump for moving liquid in the first apportioning chamber out the first outlet.

The apportioning system can further comprise a second apportioning chamber having a second outlet and fillable with liquid to a second defined level such that if liquid is added to fill the second apportioning chamber above the second defined level, then the extra fluid drains through the second outlet, and a second electrode-based pump for moving liquid in the second apportioning chamber out the second outlet, wherein the inlet channel distributes liquid to both the first apportioning chamber and the second apportioning chamber.

Preferably, the apportioning system is designed to dock with a source of liquid. Preferably, the apportioning system is fabricated from at least two planar substrates that are sealed together. Preferably, the apportioning system comprises a first planar substrate in which the inlet is formed and through which electrical leads to the electrode-based pumps are formed. Preferably, the apportioning system comprises a second planar substrate in which the apportioning chambers are formed. Preferably, the apportioning system in each of the outlets from the apportionment chambers comprise a sluice formed in the lower surface of the first planar substrate and a channel formed through the second planar substrate. Preferably, the planar substrates are formed of glass.

Preferably, when the first apportioning chamber is filled with a selected liquid, the operation of the first electrode-based pump pumps a first aliquot amount, with a reproducibility of plus or minus 10% of the first aliquot amount. Preferably, the apportioning system comprises at least four apportioning chambers and corresponding electrode-based pumps. Preferably, the apportioning system comprises at least eight apportioning chambers and corresponding electrode-based pumps.

The apportionment cassette of the invention preferably functions with a plate having a plurality uniformly sized reaction wells formed in its upper surface, wherein the density of the reaction wells is at least about 10 wells per $cm^2$. Preferably, the reaction wells are arrayed in rows and columns. Also, preferably, the plate is rectangular, preferably with the rows and columns of wells parallel to the edges of the plate. Preferably, the area of each of the openings (i.e., apertures) of the reaction wells is no more than about 55% of the area defined by the multiplication product of (1) the pitch between reaction wells in separate rows and (2) the pitch between reaction wells in separate columns. More preferably, this aperture area is no more than about 50%, yet more preferably 45%, of the area defined by the multiplication product of (1) the pitch between reaction wells in separate rows and (2) the pitch between reaction wells in separate columns. Preferably, the density of wells is no more than about 350 per $cm^2$, more preferably no more than about 150 per $cm^2$, yet more preferably no more than about 120 per $cm^2$. Preferably, the density of wells is at least about 20 wells per $cm^2$, more preferably at least about 40 wells per $cm^2$, still more preferably at least about 100 wells per $cm^2$.

Preferably, on the plate, the pitch between reaction wells in a row or column is at least about 0.5 mm, more preferably at least about 0.9 mm. Preferably, each reaction well is separated from each adjacent reaction well by at least about 0.15 mm, more preferably by at least about 0.3 mm. Preferably, each reaction well has a substantially square shape. Preferably, the plate has at least about 1,000 reaction wells, more preferably at least about 4,000 reaction wells, yet more preferably at least about 10,000 reaction wells. Preferably, the plate has a patterned gasket on its upper surface.

Preferably, the plate is designed to facilitate alignment by having a first marker on a first edge of the plate, wherein the marker is for orienting the reaction wells. Preferably, the plate has a second marker on a second edge of the plate perpendicular to the first edge, wherein the second marker is for orienting the reaction wells. More preferably, the plate has a third marker on the second edge, wherein the third marker is for orienting the of reaction wells. Preferably, the first, second and third markers are notches designed to interact with locating pins used to mechanically orient the reaction wells. Alternatively or supplementally, the plate has two optical reference structures, more preferably three, for orienting a device, such as an optical detector, relative to the reaction wells. The optical reference structures are preferably separated by at least about 4 cm. Preferably, the optical reference structures are etched into the plate.

DEFINITIONS

The following terms shall have the meaning set forth below:

capillary barrier a barrier to fluid flow in a channel comprising an opening of the channel into a larger space designed to favor the formation, by liquid in the channel, of an energy minimizing liquid surface such as a meniscus at the opening. Preferably, capillary barriers include a dam that raises the vertical height of the channel immediately before the opening into the larger space.

DETAILED DESCRIPTION

A. Introductory Description

Figure 1A:
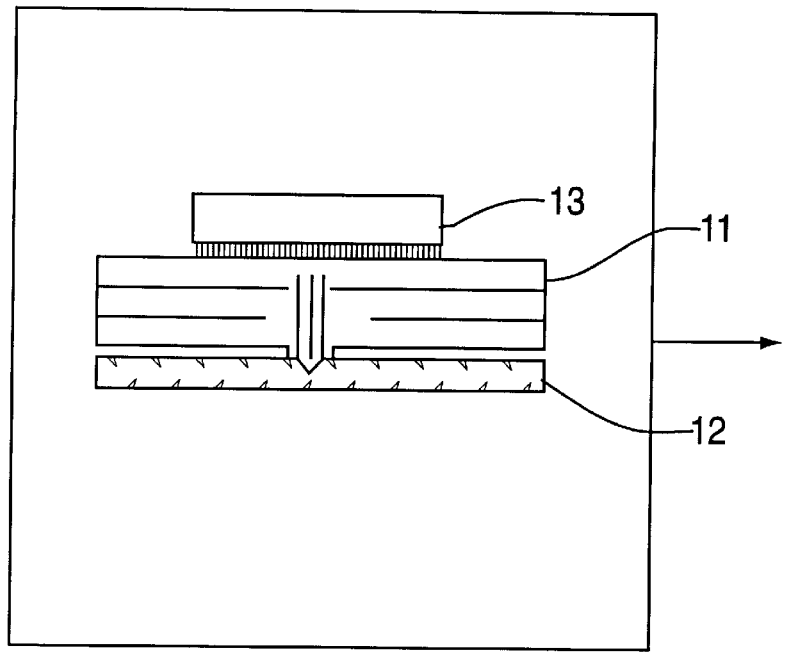
FIGS. 1A–1C depict the operation of an apportionment cassette in connection with a liquid distribution system used to synthesize compounds and a liquid distribution system used to conduct assays.

FIG. 1A shows a liquid distribution system 11 comprising three plates, preferably glass plates. Reversibly sealed to the underside of the liquid distribution system 11 is a source tray 12 which can, for instance, contain about 1,000, 4,000, 10,000 or more reaction wells 1201 (not shown). The liquid distribution system 11 can, for instance, contain a numerous reservoirs (not shown), for instance 224 reservoirs 1101, and a network of channels, electrode-based pumps and gating mechanisms (not shown) to transfer fluid from the reservoirs either to all of the reaction wells or a substantial portion of the reservoirs. The reservoirs 1101 are kept full through inlet ports 1102 (not shown) in the top plate of the distribution system 11. The electronics used to drive the electrode-based pumps 1103 (not shown) of the liquid distribution system 11 are contained in first electrical housing 13. The liquid distribution system 11 can be used to relay synthesis reagents into the reaction wells 1201. The reaction wells 1201 have reaction well outlets 1202 (shown in FIG. 2B). Further details of this liquid distribution system 11 can be found in Zanzucchi et al., "Liquid Distribution System," U.S. patent application Ser. No. 08/556,036, filed Nov. 9, 1995, which application is incorporated herein in its entirety by reference.

Figure 1B:
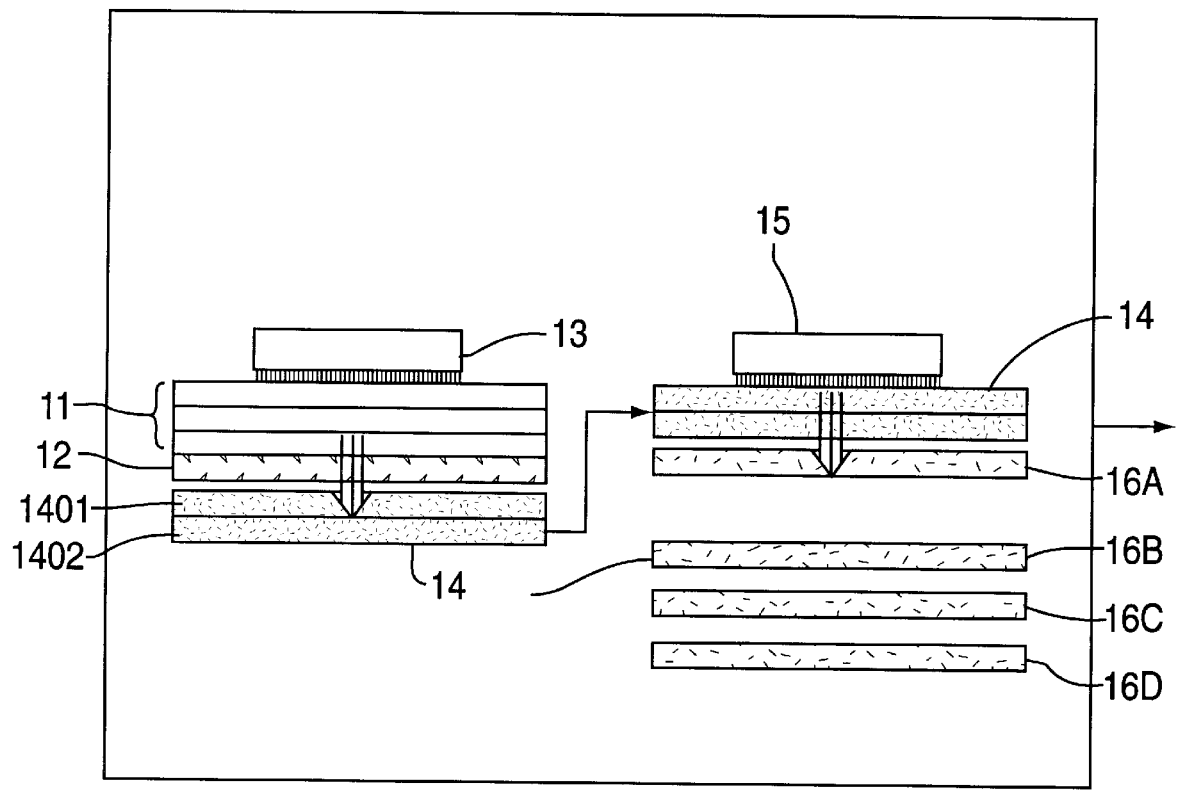

After chemicals are synthesized in the reaction wells 1201, FIG. 1B shows that an apportionment cassette 14 can be aligned under the source tray 12. In the illustration, the apportionment cassette 14 is composed of two plates, top plate 1401 and bottom plate 1402. Preferably, the apportionment cassette 14 contains the same number of apportionment systems 1403 (illustrated in FIG. 2A) as there are reaction wells 1201, with the apportionment systems having inlets 1404 (illustrated in FIG. 2B) arranged to dock with the reaction well outlets 1202 of the reaction wells 1201. As will be illustrated further below, liquid in the reaction wells 1201 can be flushed through into each of the apportionment systems 1403. Preferably, the apportionment systems have a number of apportionment chambers 1405 (not shown, illustrated in FIG. 2B), for instance eight apportionment chambers 1405.

After the apportionment chambers 1405 have been filled, FIG. 1B further shows the apportionment cassette engaged with second (apportionment) electrical housing 15. Second electrical housing 15 has electrical pins 1501 (not shown) that engage electrical pads 1406 (not shown) on the top of top plate 1401. The electrical pads 1406 are connected to the leads 1407 (see FIG. 2B) for the electrodes 1408 (not identified in Figure) that form the electrode-based pumps 1409 (see FIG. 2B). The connections are typically through circuits 1410 (not shown) printed on the top surface of the top plate 1401.

Assume for the sake of this introductory description that each apportionment system has at least four apportionment chambers 1405 and there is an apportioning system 1403 for each reaction well 1201. Also assume that first receiving tray 16A, second receiving tray 16B, third receiving tray 16C and fourth receiving tray 16D (collectively "receiving trays 16") each have the same number of receiving wells 1601 as there are reaction wells 1201. Then, the apportioning cassette is used to aliquot an amount of source liquid from each reaction well 1201 into a matching receiving well in each of first receiving tray 16A, second receiving tray 16B, third receiving tray 16C and fourth receiving tray 16D.

Figure 1C:
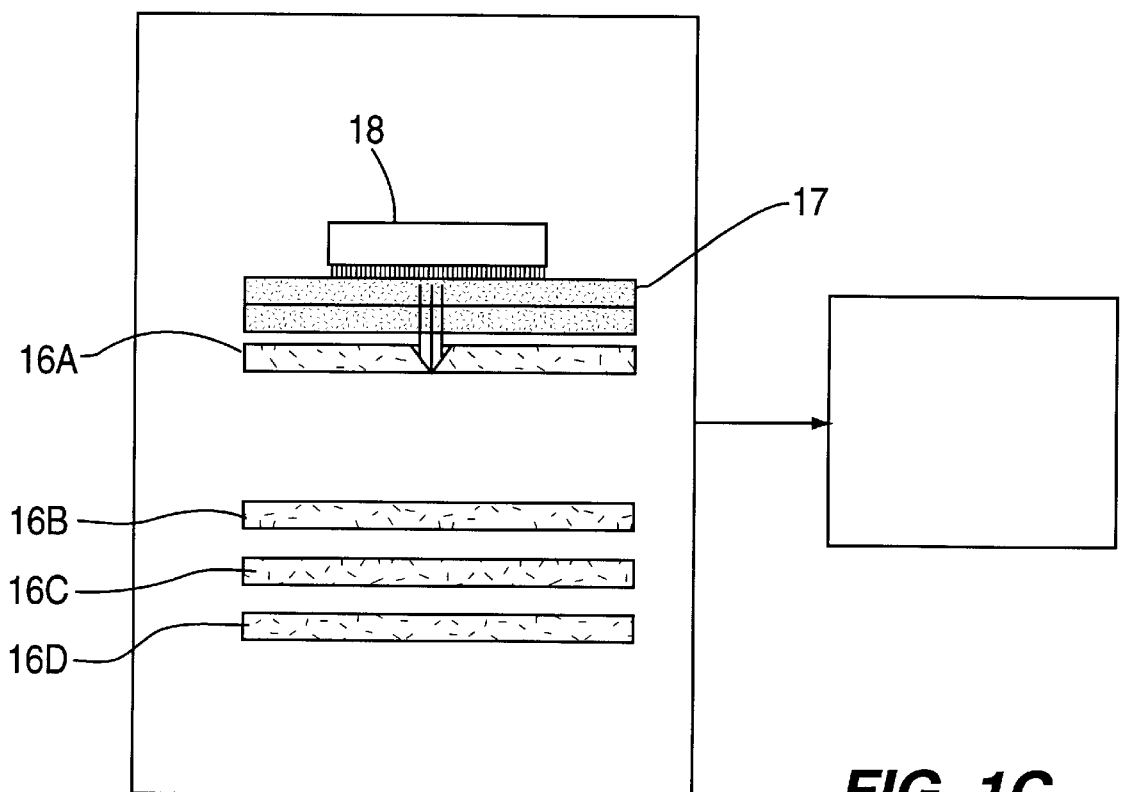

As illustrated in FIG. 1C, each receiving tray 16 is attached to an assay cassette 17, which in turn is attached to a third electrical housing 18. The receiving trays 16 are either attached concurrently to assay cassettes 17 if there are sufficient assay cassettes 17, or in turn. An assay cassette 17 is used to distribute reagents that, for instance, cause the development of color depending on the presence or absence of a biological activity in the liquid apportioned to the receiving tray 16.

Figure 2A:
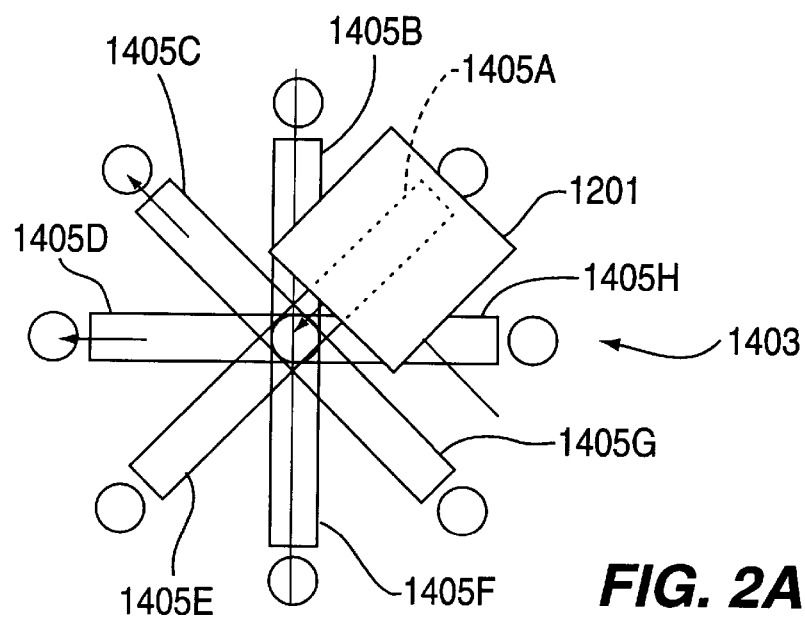
FIGS. 2A–2E focus on a particular apportionment system in the apportionment cassette of FIGS. 1A–1C.

FIG. 2A shows a top view of an apportionment system 1403 having first apportionment chamber 1405A, second apportionment chamber 1405B and so on through eighth apportionment chamber 1405H. The apportionment system 1403 is shown aligned under a reaction well 1201 formed in a source tray positioned above the apportionment cassette 14.

Figure 2B:
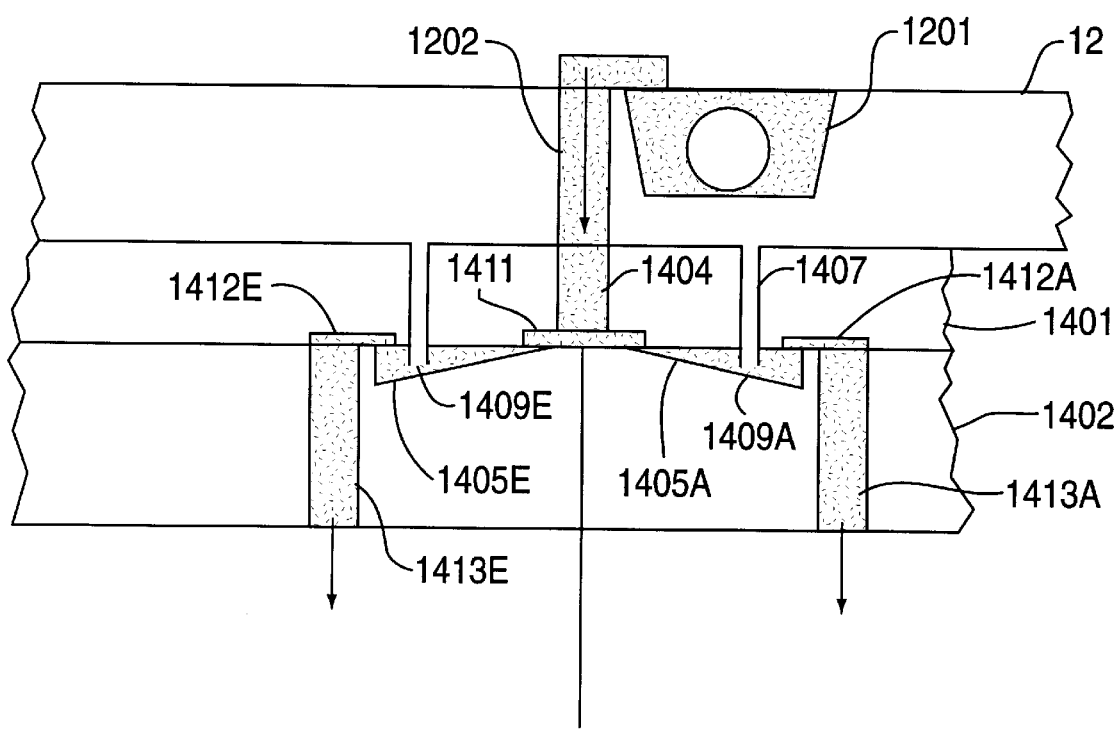

FIG. 2B shows a side view of the apportionment system 14 of FIG. 2A aligned with the reaction well 1201 formed in source tray 12. The reaction well outlet 1202 is aligned to dock with the inlet 1404 to the apportionment system 1403. At the base of inlet 1404 there is a distribution portion 1411 which can be, for instance, an open space or a frited piece of a material resistant to the liquids being apportioned (which material can be for instance glass, stainless steel, or a resistant plastic). Liquid transferred into the inlet 1404 from reaction well 1201 is distributed to all eight apportionment chambers 1405. To assure that all of the apportionment chambers are filled, an excess of liquid is transferred into the inlet 1404 for distribution into the apportionment chambers 1405. For example, in first apportionment chamber 1405A the excess portion spills over sluice 1412A and down apportionment outlet 1413A. Preferably, the junction between the sluice 1412 and the corresponding apportionment outlet 1413 forms a capillary barrier 1415 (see definition above, and further description in Section D below). The resistance to flow created by the capillary barriers 1415 causes fluid inserted through inlet 1404 to resist flowing into filled apportionment chambers 1405, thereby assuring even distribution of fluid into the apportionment chamber 1405 of a apportionment system 14.

Each apportionment chamber 1405 has an electrode-based pump 1409.

Figure 2C:
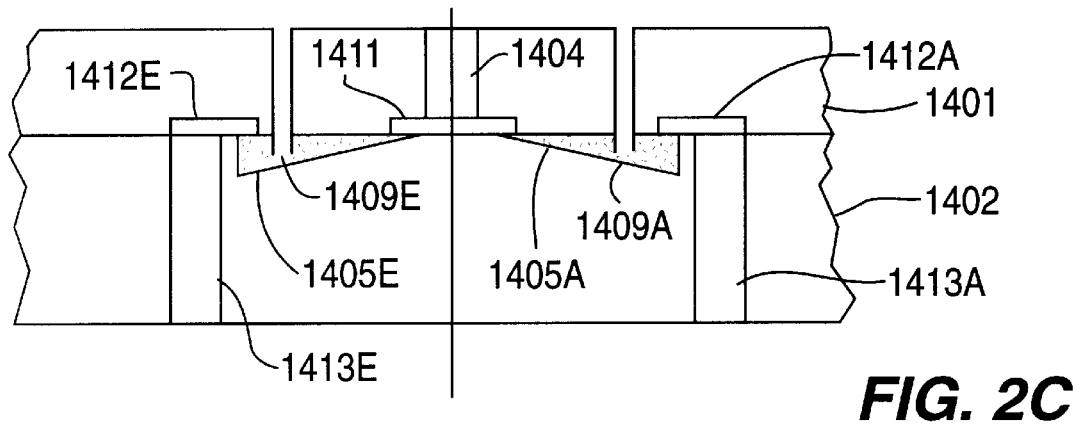

FIG. 2C shows first apportionment chamber 1405A and fifth apportionment chamber 1405E after they have been filled from reaction well 1201 and source tray 12 has been uncoupled from apportionment cassette 14.

Figure 2D:
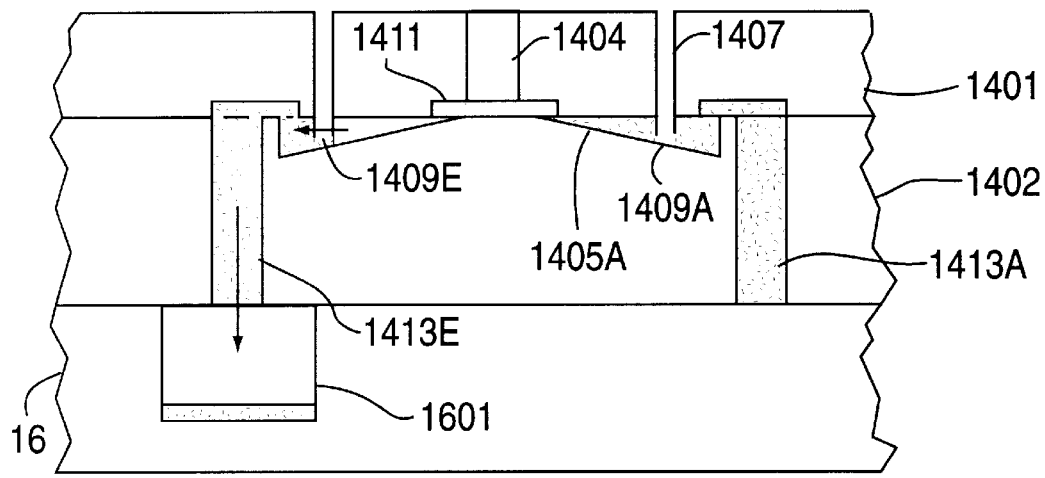
Figure 2E:
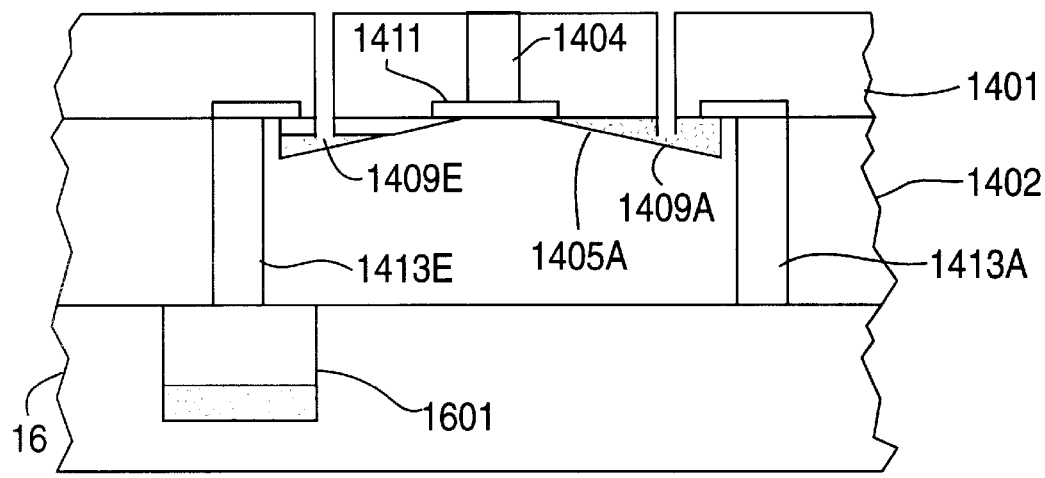

FIG. 2D shows fifth electrode-based pump 1409E activated to pump liquid out of apportionment chamber 1405E of apportionment system 1403 into receiving well 1601 of receiving tray 16 that has been aligned under apportionment cassette 14. FIG. 2E shows the apportionment system 1403 and the receiving well 1601 after fifth electrode-based pump 1409E has operated.

Preferably, the apportionment systems operate to dispense a defined amount of a given liquid, plus or minus no more than about 10% of the amount.

B. Pumps

At least two types of electrode-based pumping has been described, typically under the names "electrohydrodynamic pumping" (EHD) and "electroosmosis" (EO). EHD pumping has been described by Bart et al., "Microfabricated Electrohydrodynamic Pumps," *Sensors and Actuators,* A21–A23: 193–197, 1990 and Richter et al., "A Micromachined Electrohydrodynamic Pump," *Sensors and Actuators,* A29:159–168, 1991. EO pumps have been described by Dasgupta et al., "Electroosmosis: A Reliable Fluid Propulsion System for Flow Injection Analysis," *Anal. Chem.,* 66: 1792–1798, 1994.

EO pumping is believed to take advantage of the principle that the surfaces of many solids, including quartz, glass and the like, become charged, negatively or positively, in the presence of ionic materials, such as salts, acids or bases. The charged surfaces will attract oppositely charged counter ions in solutions of suitable conductivity. The application of a voltage to such a solution results in a migration of the counter ions to the oppositely charged electrode, and bulk of the fluid as well. The volume flow rate is proportional to the current, and the volume flow generated in the fluid is also proportional to the applied voltage. Typically, in channels of capillary dimensions, the electrodes effecting flow can be spaced further apart than in EHD pumping, since the electrodes are only involved in applying force, and not, as in EHD, in creating charges on which the force will act. EO pumping is generally perceived as a method appropriate for pumping conductive solutions.

EHD pumps have typically been viewed as suitable for moving fluids of extremely low conductivity, e.g., $10^{-14}$ to $10^{-9}$ S/cm (S/cm=Ohm$^{-1}$cm$^{-1}$). It has now been demonstrated herein that a broad range of solvents and solutions can be pumped using appropriate solutes than facilitate pumping, using appropriate electrode spacings and geometries, or using appropriate pulsed or d.c. voltages to power the electrodes, as described further below.

It is believed that an electrode-based internal pumping system can best be integrated into the apportionment cassette of the invention with flow-rate control at multiple pump sites and with relatively less complex electronics if the pumps are operated by applying pulsed voltages across the electrodes. Where the pulse-width of the voltage is $T_1$ and the pulse interval is $T_2$, typically, $T_1$ is between about 1 $\mu$s and about 1 ms, preferably between about 0.1 ms and about 1 ms. Typically, $T_2$ is between about 0.1 $\mu$s and about 10 ms, preferably between about 1 ms and about 10 ms. A pulsed voltage protocol is believed to confer other advantages including ease of integration into high density electronics (allowing for hundreds of thousands of pumps to be embedded on a wafer-sized device), reductions in the amount of electrolysis that occurs at the electrodes, reductions in thermal convection near the electrodes, and the ability to use simpler drivers. The pulse protocol can also use pulse wave geometries that are more complex than block-shaped pulse waves.

Another, procedure uses a number of electrodes, typically evenly spaced, and uses a travelling wave protocol that induces a voltage at each pair of adjacent electrodes in a timed manner that first begins to apply voltage to the first and second electrodes, then to the second and third electrodes, and so on. Such methods are described in Fuhr et al., *J. Microelectrical Systems,* 1: 141–145, 1992. It is believed that travelling wave protocols can induce temperature gradients and corresponding conductivity gradients that facilitate electric field-induced fluid flow. Such temperature gradients are also induced by positioning electrical heaters in association with the electrode-based first pumps 360 and second pumps 361.

While not wishing to be restricted to theory, several theoretical concepts are believed to play a role in the mechanics of EHD pumping. The forces acting on a dielectric fluid are believed to be described by:

$$\vec{F} = q\vec{E} + \vec{P} \cdot \nabla \vec{E} - 1/2 E^2 \nabla \epsilon + \nabla \left[ 1/2 \rho \frac{\partial e}{\partial \rho} E^2 \right]$$

where F is the force density, q is the charge density, E is the applied field, P is the polarization vector, $\epsilon$ is the permittivity and ρ is the mass density. Of the terms in the equation, the first and third are believed to be the most significant in the context of EHD pumping of fluids. The first term (qE) relates to the Coulomb interaction with a space-charge region. The third term ($\frac{1}{2}E^2\nabla\epsilon$) relates to the dielectric force which is proportional to the gradient in permitivity.

In low fields, i.e., the Ohmic region where current is linearly proportional to voltage, the primary source of charges that will be acted upon by the electric field is believed to be due to ions from additives, ions from impurities and ions formed by autodissociation of molecules in the fluid. In intermediate fields, i.e. from beyond the Ohmic region to about 2 V/μm, the charges are believed to be primarily formed by dissociation and electrolytic processes in the fluid. In higher fields, the charges are believed to be determined by injection processes at the electrodes, which electrodes inject positive or negative homocharges.

For the purposes of this application, positive (+) flow shall be flow in the direction of the negative electrode, and negative (−) flow shall be flow in the direction of the positive electrode.

In a preferred embodiment of the invention, the controller 10 has a device for storing data and stores the values of voltage and polarity suitable for pumping a number of solvents or solutions.

Experimental results indicate that the properties of fluid flow (like direction of flow) correlate well with the solvent's ability to stabilize and solvate the charged species injected or induced by the electrodes. The direction of flow is believed to be determined by the preference of the solvent to solvate either positive charges or negative ions. This solvation preference is believed to imply a greater shell of solvent molecules that will be dragged in an electric field, creating fluid movement. For example, a preferred solvation of positive charges correlates with a preference for fluid flow from the anode to the cathode (i.e., the positive direction). The degree of such a solvation preference for a solvent is believed to depend on the ability of the molecules within the solvent to accept or donate hydrogen bonds. In one aspect of the invention, for liquids whose pumping behavior has not yet been characterized, the controller will store initial pumping parameters estimated using on the Linear Solvation Energy relationships established by R. W. Taft and co-workers. See, Kamlet et al., *J. Org. Chem.*, 48: 2877–2887, 1983 and Kamlet et al., *Prog. Phys. Org. Chem.*, 13: 485, 1981. These workers have categorized solvents in terms of the following parameters: π, the ability of the solvent to stabilize a stabilize a charge or dipole by virtue of its dielectric properties; α, the hydrogen bond donating ability of the solvent; and β, the hydrogen bond accepting ability of the solvent. These parameters are more fully defined in the above-cited Kamlet et al. publications, from which these definitions are incorporated herein by reference.

Using a one mm capillary of circular cross-section, a pair of 50 micron rod-shaped, platinum electrodes perpendicularly inserted to a depth of 500 microns into the capillary with a 500 micron separation powered by a 400 V field, the direction of flow was determined for several solvents. The direction of flow and the α, β, π, ε and dipole moment values are as follows:

| Solvent | direction | α | β | π | ε | dipole moment |
|---|---|---|---|---|---|---|
| ethanol | − | 0.83 | 0.77 | .54 | 24.55 | 1.69 |
| tetrahydro-furan | + | 0 | 0.55 | .58 | 7.58 | 1.75 |
| chloroform | − | 0.44 | 0 | .58 | 4.806 | 1.01 |
| acetone | + | 0.08 | 0.48 | .71 | 20.7 | 2.69 |
| methanol | − | 0.93 | 0.62 | .6 | 32.7 | 2.87 |
| 2-propanol | +/− | 0.76 | 0.95 | .48 | 19.92 | 1.66 |
| acetonitrile | + | 0.19 | 0.31 | .75 | 37.5 | 3.92 |
| N-methyl-pyrrolidone | + | 0 | 0.77 | .92 | 32.0 | 4.09 |
| diethyl ether | + | 0 | 0.47 | 0.27 | 4.335 | 1.15 |
| 1,2 dichloro ethane | − | 0 | 0 | 0.81 | 10.36 | 1.2 |
| DMF | + | 0 | 0.69 | .88 | 36.71 | 3.86 |

It is believed that the α and β values reflect the ability of the solvent under an electric field to solvate a negative or positive charged species, with the magnitude of α−β correlating with (−) flow, and the magnitude of β−α correlating with (+) flow. According to one aspect of the invention, the preferred direction of flow of a liquid can be reversed from that predicted as above if the fluid has a difference in α and β values that is small but not zero and the electrode pair used creates an asymmetric field, such that the acting force on either positive or negative charged species is enhanced. One such electrode pair has an alpha electrode with a sharp point pointing in the direction of intended flow and a beta electrode that lines the walls of the channel in which it is located. Such an electrode-based pump, fabricated in a 1 mm capillary, has been shown to be effective to pump 2-propanol in the direction pointed to by the alpha electrode 364 either when the voltage applied to the electrodes implied a (−) direction of flow or when the voltage applied to the electrodes implied a (+) direction of flow.

The pumping parameters of a liquid can be calibrated using a plug of the liquid disposed in a capillary that has an electrode-based pump and is angled uphill. If optical devices are associated with the capillary for monitoring the position of the plug, the velocity of pumped flow uphill and the velocity of gravity driven downhill motion can be measured. With these velocities and the angle of the capillary, the pressure applied to the liquid can be calculated. Fluid resistance, $R=(8\bullet\mu\bullet l)/\pi r^4$, where μ defines viscosity and /=the length of the fluid plug; Pressure, $P=RA(v_{up}-v_{down})$, where A=cross-sectional area. The efficiency of the pump can also be calculated $(\eta=(q\bullet\rho\bullet Q\bullet N_A)/m\bullet|$, where q=charge of e⁻, ρ=density of liquid, Q=flow rate=$v_{up}\bullet A$, m=mass of liquid, and |=current). The velocities can be measured with multiple single point observations of the location of either the front or rear interfaces of the plug using fixed LEDs and optical detectors or in a continuous mode using a light and a silicon photodiode position sensor, such as a SL15 or SC10 position sensor available from UDT Sensors, Inc., Hawthorne, Calif. With the latter method, the correlation between the signal produced at the difference amplifier connected to the position sensor must be calibrated prior to experimental use.

The pumping parameters for a number of solvents have been determined in the 1 mm capillary described above, as follows:

| Solvent | Flow rate, Q μl/sec | Pressure, P N/m² | electrical efficiency, η, molecules/e⁻ |
| --- | --- | --- | --- |
| acetone | 14.56 | 16.33 | $1.9 \times 10^6$ |
| methanol | 24.46 | 26.32 | $9.7 \times 10^4$ |
| 1-propanol | 16.39 | 74.89 | $4.2 \times 10^5$ |
| diethyl ether | 18.44 | 20.45 | $5.8 \times 10^8$ |
| 1,2 dichloroethane | 14.24 | 46.55 | $2.9 \times 10^7$ |

Another aspect of pumping is the observation that fluids that are resistant to pumping at a reasonable field strength can be made more susceptible to electrode-based pumping by adding a suitable flow-enhancing additive. Preferably, the flow-enhancing additive is miscible with the resistant fluid and can be pumped at high pressure, P, high flow rate, Q, and good electrical efficiency, η (i.e., molecules pumped per electron of current). Generally, the flow-enhancing additive comprises between about 0.05% w/w and about 10% w/w of the flow-resistant fluid, preferably between about 0.1% w/w and about 5% w/w, more preferably between about 0.1% w/w and about 1% w/w. Carbon tetrachloride and cyclohexane do not pump using the electrode pump situated in a capillary described above at a voltage of 2,000 V. By adding 0.5% w/w acetone or methanol as a flow-enhancing additive, both of these fluids can be pumped at a voltage of 1,000 V. In some cases, it is desirable to reverse the preferred flow direction of a liquid by mixing with it a flow-enhancing additive that strongly pumps in the desired direction. In all cases, additives are selected on the basis of their pumping characteristics and their compatibility with the chemistries or other processes sought to be achieved.

The electrode-based pumps of the invention can be operated as a valve to resist flow in a certain direction by operating the pumps to counter the unwanted flow. To power the electrode-based pumps, one or more digital drivers, consisting of, for example, a shift register, latch, gate and switching device, such as a DMOS transistor, permits simplified electronics so that fluid flow in each of the channels can be controlled independently. Preferably, each digital driver is connected to multiple switching devices that each can be used to control the pumping rate of a separate electrode-based pump.

C. Fabrication of Electrode-Based Pumps

The apportioning system requires numerous electrodes for pumping fluids. These electrodes are generally fabricated in a top plate of an apportionment cassette, where the apportionment cassette is formed of two or more cassettes. Typically each pump is made up of a pair of closely spaced electrodes (e.g. 50 to 250 microns separation). The electrodes are fabricated with diameters of preferably about 25 microns to about 150 microns, more preferably about 50 microns to about 75 microns. In preferred embodiments, the apportionment cassette, for example, is designed to accept liquid from or deliver liquid to plates containing 1,000, more preferably 10,000 reaction wells. This means that the apportionment cassette will preferably contain an equal number of apportioning systems, each with at least one, and preferably more, apportioning chambers, each needing an electrode-based pump. Thus, an apportionment cassette can require, for instance, about 1,000 to about 80,000 electrode-based pumps. To produce such structures using mass production techniques requires forming the electrodes in a parallel, rather than sequential fashion. A preferred method of forming the electrodes involves forming the holes in the plate (e.g., top plate 1401) through which the electrodes will protrude, filling the holes with a metallic thick film ink (i.e., a so-called "via ink", which is a fluid material that sinters at a given temperature to form a mass that, upon cooling below the sintering temperature, is an electrically conductive solid) and then firing the plate and ink fill to convert the ink into a good conductor that also seals the holes against fluid leakage. The method also creates portions of the electrodes that protrude through the plate to, on one side, provide the electrodes that will protrude into the liquids in fluid channels and, on the other side, provide contact points for attaching electrical controls.

For example, holes are drilled in 500 micron thick plates of borosilicate glass using an excimer laser. The holes having diameters between 50 and 150 microns are then filled with thick film inks, using an commercial Injection Via-fill Machine (Pacific Trinetics Model #VF-1000, San Marcos, Calif.). It has been discovered that only select formulations of via inks sufficiently function to fill such high aspect ratio holes such that the fired ink adheres to the sides of the holes, does not crack during the firing process, and seals the holes against fluid flow. One parameter that is important to so forming sealed, conductive conduits through high aspect holes is selecting metal powder and glass powder components for the via ink that have sufficiently fine dimensions. One suitable formulation uses:

89.3% w/w, 12-507 Au powder (gold particles, Technic Inc., Woonsocket, R.I.);

5.7% w/w, F-92 powdered lead borosilicate glass (O. Hommel Co., Carnegie, Pa.);

2.4% w/w of 15% w/v ethyl cellulose N-300 (Aqualon, Wilmington, Del.) in Texanol™ (monoisobutarate ester of 2,2,4-trimethyl-1,3-pentandiol, Eastman Chemical Products, Kingsport, Tenn.);

2.1% w/w of 15% w/v Elvacite 2045™ (polyisobutyl methacrylate) in Terpineol T-318 (mixed tertiary terpene alcohols, Hercules Inc., Wilmington, Del.); and 0.5% w/w, Duomeen TDO™ (N-tallow alkyl trimethylenediamine oleates, Akzo Chemicals, Chicago, Ill.).

The gold powder from Technic, Inc. has an average particle diameter of 0.9 microns. Another suitable formulation uses:

80.8% w/w, Ag Powder Q powder (silver particles, Metz, South Plainfield, N.J.);

5.2% w/w, F-92 powdered lead borosilicate glass (O. Hommel Co. Carnegie, Pa.);

3.7% w/w, VC-1 resin (37% w/w Terpineol T-318, 55.5% w/w butyl carbitol, 7.5% w/w ethylcellulose N-300, Aqualon, Wilmington, Del.);

4.0% w/w of 15% w/v ethyl cellulose N-300 in Texanol™;

4.1% w/w, 15% w/v Elvacite 2045™ (polyisobutyl methacrylate) in Terpineol T-318;

0.6% w/w, Duomeen TDO™; and 1.6% w/w, Terpineol.

These formulations were fired at 550° C. to form high aspect ratio conductive conduits.

When the size of the glass or metal powders increases, good filling properties (lack of cracking, good sealing against liquids, good adherence to sides of hole) can often still be obtained by decreasing the amount of organic in the via ink.

The devices used to insert via inks into holes in a plate typically include a metal stencil with openings corresponding to the openings in the plate. Via ink is applied above the stencil, which rests on the plate, and a bladder device is used to pressurize the ink to force it to fill the holes. After filling, the plate with its via ink-filled holes is removed for further processing, as described below.

Prior to firing, much of the organic component of the via ink is evaporated away by, for example, placing the ink-filled plate in a oven (e.g. at 100° C.) for one to five minutes. Preferably, the firing is conducted at a temperature from about 450° C. to about 700° C., more preferably from about 500° C. to about 550° C. However, the upper end of the appropriate firing temperature range is primarily dictated by the temperature at which the plate being treated would begin to warp. Accordingly, with some types of plates much higher temperatures could be contemplated.

To assure that there is conductive material that protrudes above or below the plate after firing, the top and bottom surface of the plate can be coated with sacrificial layers of thicknesses equaling the length of the desired protrusions. The sacrificial layers can be applied before or after the holes are formed in the plate. If before, then the holes are formed through both the plate and the sacrificial layers. If after, then (a) corresponding openings through the sacrificial layers can be created by creating a gas pressure difference from one side of the plate to the other, which pressure difference blows clear the sacrificial material covering the holes or (b) such openings through at least the top sacrificial layer are created when the pressure of the ink pushes through the sacrificial layer and into the holes (leaving an innocuous amount of sacrificial layer material in the holes). An appropriate sacrificial layer burns away during the firing process. Sacrificial layers can be made coating a plate with, for instance, 5–25 w/w % mixtures of ethyl cellulose resin (e.g., Ethyl Cellulose N-300, Aqualon, Wilmington, Del.) dissolved in Terpineol T-318™ or Texanol™, or 5–50% w/w mixtures of Elvacite 2045™ in Terpineol T-318™. After firing, the surfaces of the electrode can be enhanced by plating with metals, such as nickel, silver, gold, platinum, rhodium, etc. In some embodiments, the electrodes are plated with a layer of nickel followed by a layer of gold (to passivate the nickel). The depositions of such metals can be performed using standard electrolytic and/or electroless plating baths and techniques.

Preferably, where a plate that is to contain etched openings will be processed to include electrodes, the etching occurs first, followed by coating with the sacrificial layer and forming the electrode holes.

In an alternate method of manufacture, for each pump, two or more metal wires, for example gold or platinum wires about 1–10 mils in diameter, are inserted into the openings in the channel walls about, e.g., 150 microns apart. The wires were sealed into the channels by means of a conventional gold or platinum via fill ink made of finely divided metal particles in a glass matrix. After applying the via fill ink about the base of the wire on the outside of the opening, the channel is heated to a temperature above the flow temperature of the via fill ink glass, providing an excellent seal between the wires and the channel. The via ink, which is used to seal the holes, can be substituted with, for instance, solder or an adhesive.

D. Capillary barriers

Figure 3A:
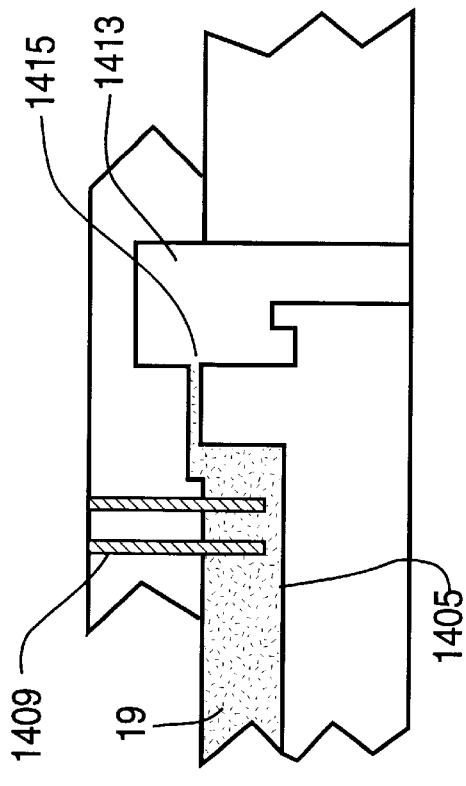
FIGS. 3A–3D focus on capillary barriers that can be used in an apportionment system.

Capillary barriers have been described above. However, more complex design considerations than were discussed above can, in some cases, affect the design of the capillary barrier 1415, which impedes liquid from flowing into apportionment outlets 1413. In some cases it is desirable to narrow the sluice formed by sluice 1412 to increase the impedance to flow (i.e., the frictional resistance to flow) as appropriate to arrive at an appropriate flow rate when the associated electrode-based pump 1409 is activated. Such a narrowing is illustrated by comparing the sluice 1412 of FIG. 3A with the narrowed sluice 1412 of FIG. 3D. The problem that this design alteration can create is that narrower channels can increase capillary forces, thereby limiting the effectiveness of channel breaks.

Figure 3B:
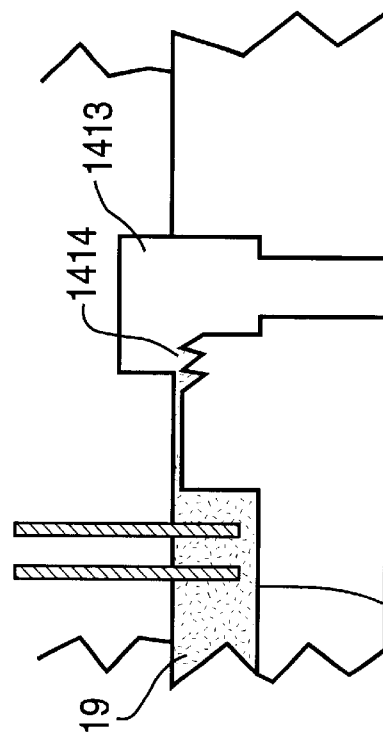
Figure 3C:
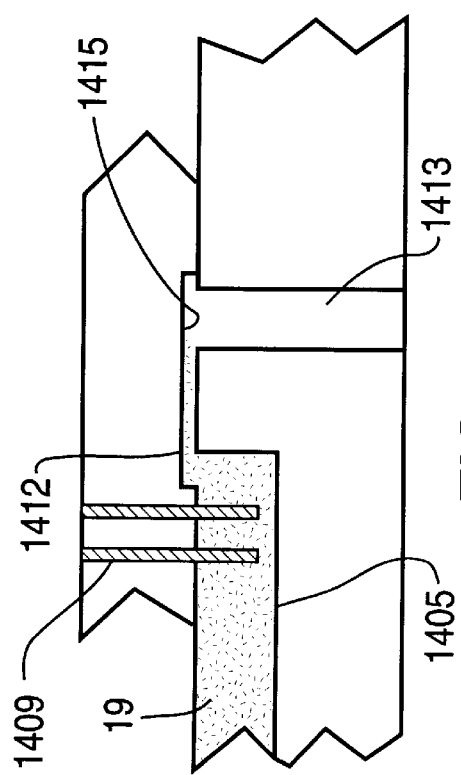
Figure 3D:
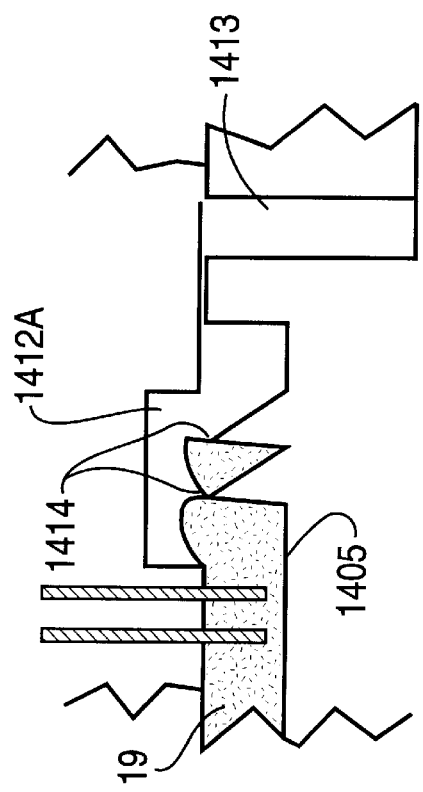

Thus, in one preferred embodiment, a channel break further includes one or more upwardly oriented sharp edges 1414, as illustrated in FIGS. 3B and 3C. More preferably, a channel break includes two or more upwardly oriented sharp edges 1414. In FIG. 3B, portion 1412A of sluice 1412 is cut more deeply into top plate 1401 to create an open space useful for the operation of upwardly oriented sharp edges 1414.

E. Supply Trays and Receiving Trays

Reaction wells 1201 are typically depressions formed in the upper layers of a supply tray 12. In FIG. 2B, reaction well outlet 1202 is connected to reaction well 1201 by sluice 1412. In this case, flushing volumes, which are substantial volumes relative to the volume of the reaction well but minuscule in absolute amount (e.g., 150 nl), are passed through the reaction well 1201 to remove all of a given reactant previously directed into the reaction well 1201.

Preferably, synthetic processes conducted in the reaction wells 1201 of the supply tray 12 will take place on insoluble supports, typically referred to as "beads", such as the styrene-divinylbenzene copolymerizate used by Merrifield when he introduced solid phase peptide synthetic techniques. Merrifield, *J. Am. Chem. Soc.* 85: 2149, 1963. See, also Barany et al., "Recent Advances in Solid-Phase Synthesis," in *Innovation and Perspectives in Solid Phase Synthesis: Peptides, Polypeptides, and Oligonucleotides,* Roger Epton, Ed., collected papers of the 2nd International Symposium, 27–31 Aug., 1991, Canterbury, England, p. 29. These supports are typically derivatized to provide a "handle" to which the first building block of an anticipated product can be reversibly attached. In the peptide synthesis area, suitable supports include a p-alkoyxbenzyl alcohol resin ("Wang" or PAM resin) available from Bachem Bioscience, Inc., King of Prussia, Pa.), substituted 2-chlorotrityl resins available from Advanced Chemtech, Louisville, Ky., and polyethylene glycol grafted polystyrene resins (PEG-PS resins) are available from PerSeptive Biosystems, Framingham, Mass. or under the tradename TentaGel, from Rapp Polymere, Germany. Similar solid phase supports, such as polystyrene beads, are also used in the synthesis of oligonucleotides by the phosphotriester approach (see Dhristodoulou, "Oligonucleotide Synthesis: Phosphotriester Approach," in *Protocols for Oligonucleotide Conjugates,* S. Agrawal, Ed., Humana Press, N.J., 1994), by the phosphoramidite approach (see Beaucage, "Oligodeoxynucleotide Synthesis: Phosphoramidite Approach," in *Protocols for Oligonucleotide Conjugates,* S. Agrawal, Ed., Humana Press, N.J., 1994), by the H-phosponate approach (see Froehler, Oligodeoxynucleotide Synthesis: H-Posponate Approach," in *Protocols for Oligonucleotide Conjugates,* S. Agrawal, Ed., Humana Press, N.J., 1994), or by the silyl-phosphoramidite method (see Damha and Ogilvie, Oligodeoxynucleotide Synthesis: "Silyl-Phosphoramidite Method," in *Protocols for Oligonucleotide Conjugates,* S. Agrawal, Ed., Humana Press, N.J., 1994). Suitable supports for oligonucleotide synthesis include the controlled pore glass (cpg) and polystyrene supports available from Applied Biosystems, Foster City, Calif. Solid supports are also used in other small molecule and polymeric organic syntheses, as illustrated in oligocarbamate synthesis for organic polymeric diversity as described by Gorden et al., *J. Medicinal Chem.* 37: 1385–1401, 1994.

Preferably, the reaction wells 1201 are rectangular with horizontal dimensions of about 400 microns to about 1200 microns, more preferably about 500 microns to about 1000 microns, yet more preferably about 640 microns, and a depth of about 200 microns to about 400 microns. Where beads will be used in the reaction wells 1201, the depth of the reaction wells 1201 is preferably at least about 50 microns greater than the swelled diameter of the beads. The support beads typically used as in solid-phase syntheses typically have diameters between about 50 microns and about 250 microns, and reactive site capacities of between about 0.1 mmoles/g and about 1.6 mmoles/g. Typically, between about 1 and about 10 of such beads are loaded into a reaction well 1201 to provide a desired capacity of between about 1 nmole and about 10 nmole per reaction well 1201. Recently, beads have become available that have a diameter that ranges between about 200 microns and about 400 microns, depending on the solvent used to swell the beads and the variation in size between the individual beads, and a reactive site capacity of between about 5 nmole and about 20 nmole per bead have become available. These large beads include the beads sold by Polymer Laboratories, Amhearst, Mass. Desirable reactive site functionalities include halogen, alcohol, amine and carboxylic acid groups. With these large beads, preferably only one bead is loaded into each reaction well 1201.

Receiving wells 1601 are typically depressions formed in the upper layers of a receiving tray 16. Receiving wells 1601 can be fabricated with or without outlets, depending on the processes intended to be conducted in the receiving wells 1601.

F. Fabrication of Apportionment Cassettes, Supply Trays and Receiving Trays

The apportionment cassettes, supply trays and receiving trays of the invention can be constructed a support material that is, or can be made, resistant to the chemicals sought to be used in the chemical processes to be conducted in the device. For all of the above-described embodiments, the preferred support material will be one that has shown itself susceptible to microfabrication methods that can form channels having cross-sectional dimensions between about 50 microns and about 250 microns, such as glass, fused silica, quartz, silicon wafer or suitable plastics. Glass, quartz, silicon and plastic support materials are preferably surface treated with a suitable treatment reagent such as a siliconizing agent, which minimize the reactive sites on the material, including reactive sites that bind to biological molecules such as proteins or nucleic acids. In embodiments that require relatively densely packed electrical devices, a non-conducting support material, such as a suitable glass, is preferred. Preferred glasses include borosilicate glasses, low-alkali lime-silica glasses, vitreous silica (quartz) or other glasses of like durability when subjected to a variety of chemicals. Borosilicate glasses, such as Corning 0211, 1733, 1737 or 7740 glasses, available from Corning Glass Co., Corning, N.Y., are among the preferred glasses.

The apportionment cassette of the invention is preferably constructed from separate plates of materials on which channels, distribution portions and chambers are formed, and these plates are later joined to form the apportionment cassette. The joinder of plates can be done, for instance, using adhesives, or techniques such as glass-glass thermal bonding. The plates are typically rectangular with planar dimensions of between about 2 inch and about 8 inch. Preferably, the thickness of the plates is from about 0.01 inch and about 0.1 inch, more preferably from about 0.015 inch to about 0.03 inch.

One preferred method of permanently joining the plates is to first coat the plate with a layer of glass glaze generally having a thickness between about 50 microns and about 500 microns, more preferably between about 75 microns and about 125 microns. The above thicknesses contemplate that substantial amounts of channel structure will be formed in the glaze layer. Otherwise, the glaze generally has a thickness between about 1 microns and about 100 microns, more preferably between about 10 microns and about 25 microns. These methods are preferably applied to join glass plates. Suitable glazes are available from Ferro Corp., Cincinnati, Ohio. The glazed plate is treated to create channels, reservoirs, or reaction cells as described below. The glazed plate is positioned against another plate, which preferably is not glazed, and the two plates are heated to a temperature of about the softening temperature of the glaze or higher, but less than the softening temperature for the non-glaze portion of the plates.

Another preferred method of permanently joining glass plates uses a field assisted thermal bonding process. It has now been discovered that glass-glass sealing using field assist thermal bonding is possible despite the low conductivity of glass if a field assist bonding material is interposed between the plates to be bonded.

To the top or bottom surface of one glass plate a layer of a field assist bonding material is applied. Preferably, the field assist bonding material layer has a thickness between about 50 nm and about 1,000 nm, more preferably, between about 150 nm and about 500 nm. The field assist bonding material can be a material capable of bonding glass substrates using the method described herein. Preferably, the field assist bonding material is silicon or silica. More preferably, the field assist bonding material is silicon.

Figure 4:
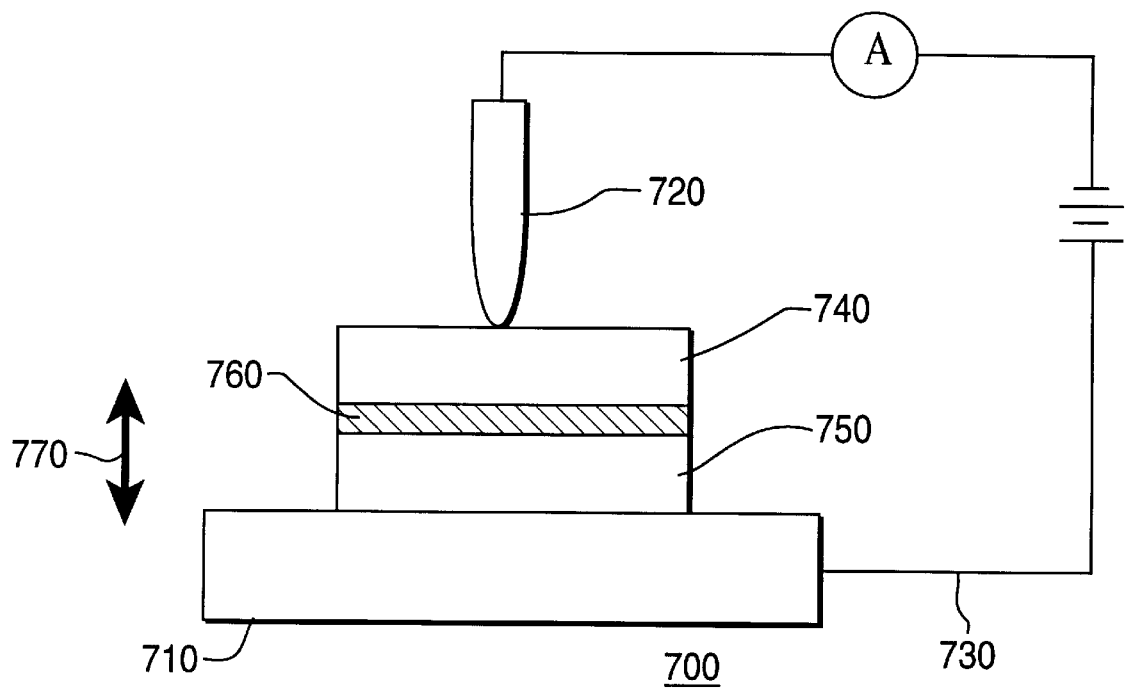
FIG. 4 illustrates a method of joining two plates to manufacture an apportionment cassette.

The field assist bonding material can be applied to a plate, for instance, by chemical vapor deposition or by a sputtering process where surface molecules are emitted from a cathode when the cathode is bombarded with positive ions from a rare gas discharge and the surface molecules collide with and bond to a nearby substrate. Pursuant to the present invention, silicon layers of between about 150 nm and about 500 nm thickness have been bonded to glass plates under conditions that can be expected to generate an outer surface layer of silicon dioxide, such as an about 20 Å layer, although the sealing process is believed to be effective in the absence of this layer. The coated plate is treated, as needed, to create channels, reservoirs, or reaction cells using the method described below. Alternatively, the plate was so treated prior to coating with the field-assist bonding material. The coated plate is then positioned against another plate, which preferably is not coated, and placed in a field assisted bonding device 700 such as that illustrated in FIG. 4. The field assisted bonding device 700 has a heating device 710, such as a heating plate. The field assisted bonding device 700 further has an electrode 720 and a ground 730 that allows a voltage to be applied across the first plate 740 and the second plate 750, to which second plate 750 has been applied a layer of silicon 760. Arrows 770 indicate the electric field orientation. Generally, the field assisted bonding is conducted under a normal atmosphere.

The plates are brought to a temperature that is effective, when an appropriate electric field is applied across the plates, to accelerate the bonding process. While not wishing to be bound by theory, it is believed that the combination of a cathode applied to the first plate 740 and the greater exchange-site mobility of ions (such as sodium ions) caused by the elevated temperature causes an ion depletion on the face of the first plate 740 opposite that to which the cathode is applied. The ion depletion, it is believed, causes a surface charge at the bottom surface of first plate 740, which correlates with the creation of a strong localized electrostatic attraction for the second plate 750. It is clear that this process creates strong bonding between the substrates and, it is believed that this is due to the formation of chemical bonds between the silica of the first plate 740 and the silicon coated onto the second plate 750. Preferably, the temperature is brought to from about 200° C. to about 600° C., more preferably from about 300° C. to about 450° C. During the process an voltage typically from about 200 V to about 2,500 V, preferably from about 500 V to about 1500 V, is applied across the first plate 740 and second plate 750. The voltage most suitably applied varies with the thickness of the plates. The voltage pulls the first plate 740 and second plate 750, including the silicon layer 760 applied to one of the plates, into intimate contact. Typically, hermetic sealing is achieved within minutes to about an hour, depending on the planar dimensions of the plates. The time required to achieve adequate sealing varies with, among other things, the smoothness of the plates, the electrical field strength, the temperature, and the dimensions of the plates. Bonding between the plates is typically apparent visually, since it is accompanied by the disappearance of the interface between the plates and the formation of gray color at the bonded regions that can be seen when an observer looks through the thinner dimensions of the two plates.

The method described above can be used to bond a glass substrate to another glass substrate and to a third glass substrate simultaneously.

Those of ordinary skill will recognize that while a hot plate is illustrated as providing the heating for the thermal assisted bonding, other heating devices, including ovens, may be used. It will also be realized that it is desirable to match, when possible, the coefficients of thermal expansion of the substrates to be bonded.

The reservoirs, reaction cells, horizontal channels and other structures of the apportionment cassettes, supply trays, and receiving trays can be made by the following procedure. A plate is coated sequentially on both sides with, first, a thin chromium layer of about 500 Å thickness and, second, a gold film about 2000 angstroms thick in known manner, as by evaporation or sputtering, to protect the plate from subsequent etchants. A two micron layer of a photoresist, such as Dynakem EPA of Hoechst-Celanese Corp., Bridgewater, N.J., is spun on and the photoresist is exposed, either using a mask or using square or rectangular images, suitably using the MRS 4500 panel stepper available from MRS Technology, Inc., Acton, Mass. After development to form openings in the resist layer, and baking the resist to remove the solvent, the gold layer in the openings is etched away using a standard etch of 4 grams of potassium iodide and 1 gram of iodine ($I_2$) in 25 ml of water. The underlying chromium layer is then separately etched using an acid chromium etch, such as KTI Chrome Etch of KTI Chemicals, Inc., Sunnyvale, Calif. The plate is then etched in an ultrasonic bath of $HF$—$HNO_3$—$H_2O$ in a ratio by volume of 14:20:66. The use of this etchant in an ultrasonic bath produces vertical sidewalls for the various structures. Etching is continued until the desired etch depth is obtained. Vertical channels are typically formed by laser ablation.

The various horizontal channels of the apportionment system embodiments typically have depths of about 50 microns to about 250 microns, preferably from about 50 microns to about 150 microns, more preferably from about 50 microns to about 100 microns. The widths of the horizontal channels and the diameters of the vertical channels are typically from about 50 microns to about 250 microns, preferably from about 120 microns to about 250 microns, more preferably from about 150 microns to about 200 microns.

G. Sealing Between Apportionment Cassette and Supply or Receiving Trays

A gasket can be used to reversibly seal the plate to an instrument that functions with the plate. The gasket can be attached to the plate, leaving openings for the cells and other structures, as needed. One method of attaching the gasket is silk-screening. The silk-screened gasket can be made of silicone or another chemically-resistant, resilient material.

Alternatively, a multi-step compression-molding process that utilizes photolithography can be applied. First, the top surface of the plate, on which generally cells and other structures have been formed, is coated with a photoresist. Preferably, the photoresist layer is about 1 mil in thickness. The photoresist layer is treated by standard photolithography techniques to remove photoresist from those areas (the "gasket areas") away from the apertures of the cells where gasket material is desired. A layer of a flowable gasket material that can be cured to a resilient, elastomeric solid is applied. A platen having a polished surface, for instance a polished glass surface, is placed above the gasket material and pressure is applied to push the gasket material into the gasket areas and substantially clear the gasket material from the photoresist-coated areas. The gasket material is now cured. The photoresist is then dissolved, leaving the plate with a patterned gasket. The gasket material is substantially cleared if it is sufficiently cleared to allow the underlying photoresist to be dissolved.

In this process, the gasket material is any elastomeric material that is suitable for use in the above-described compression molding technique, that is, when cured, compatible with the chemistries that are to be practiced in the plate on which the gasket is formed, and that is, when cured, resistant to the solvents used to remove the photoresist. The gasket material is preferably silicone, such as RTV type silicone rubber (e.g., Silastic J, RTV Silicone Rubber available from Dow Corning, Midland, Mich.). The photoresist can be a film-type photoresist such that typically the structures on the plate will not be filled during the compression-molding process or a liquid-type photoresist such that the structures will temporarily be filled during the compression-molding process and etched away at the completion of the process. In some instances, it is desirable to treat the plate, prior to the application of the photo-resist, with a primer for promoting the adhesion of the gasket material, such as 1200 RTV Prime Coat from Dow Corning, Midland, Mich. The plate can also be roughened to promote the adhesion of the gasket material to the plate. For example, 5 micron roughness can be produced by lapping. The platen is preferably treated with a release-promoter, or a release promoter is incorporated into the gasket material, as it is in Silastic J silicone rubber. The compression-molding process can leave thin residues of gasket material at unwanted locations. These residues are laser cut away from the plate or, in some cases, are removed using a timed exposure to a solvent that dissolves the thin film of exposed gasket material residue without having substantial effect on the thicker layer of gasket material found at desired locations.

H. Fabrication of Electrical Connectors

Figure 5:
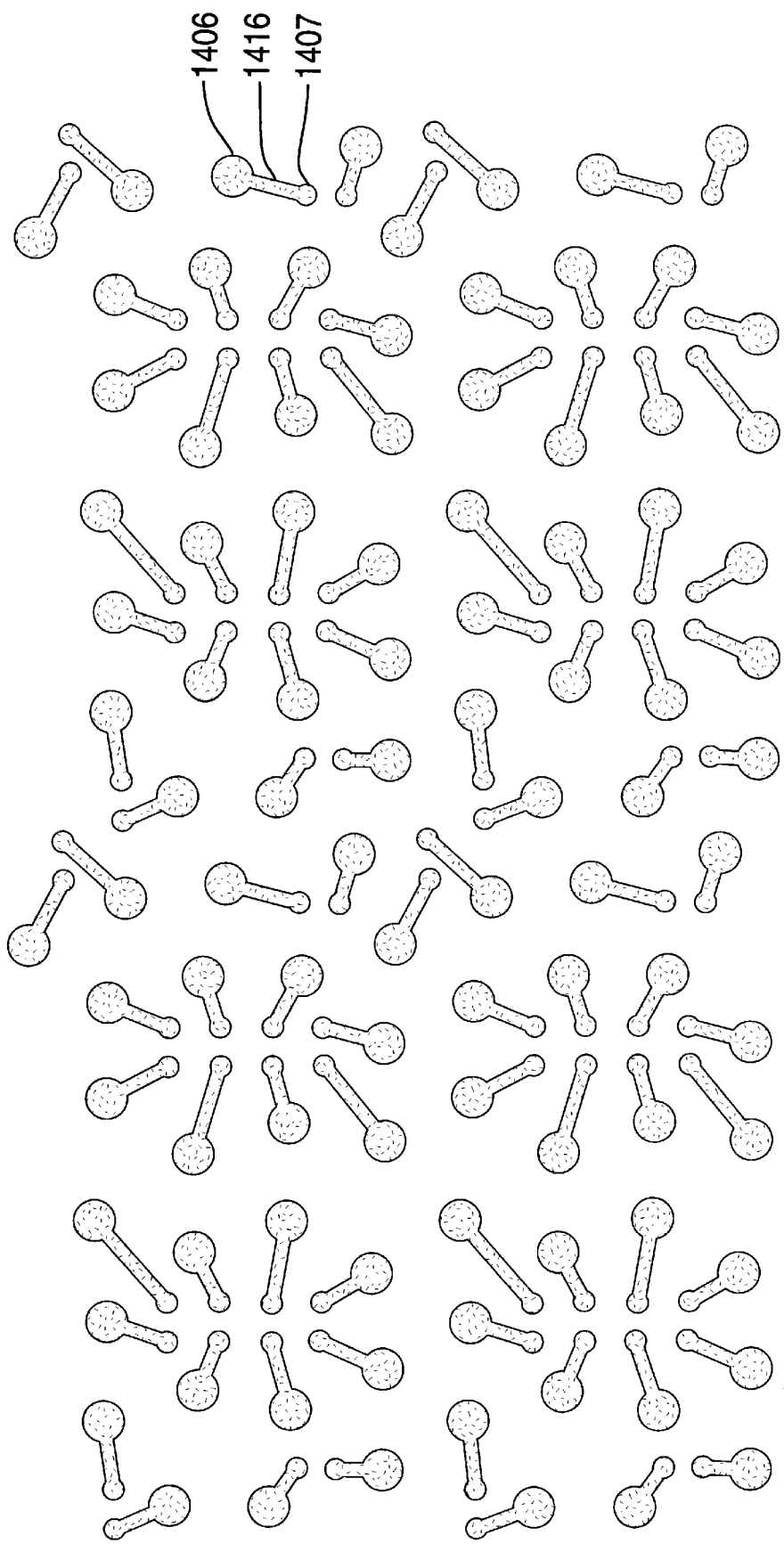
FIG. 5 illustrates an electrical contact surface at the top of an apportionment cassette for use in connecting an electrical controller for powering the electrode-based pumps.

Electrical contacts with the leads 1407 for electrodes 1408 can be effected using electrical pads 1406 formed in the upper surface of top plate 1401. The electrical pads 1406 are each connected to a lead 1407 by an electrical connector 1416, as illustrated in FIG. 5. In FIG. 5, numerous electrical pads 1406, electrical connectors 1416 and leads 1407 are illustrated, though only one of each is labeled. The electrical pads 1406 and electrical connectors 1416 are typically formed by thin film lithography using hard gold.

What is claimed:

1. An apportioning system for apportioning liquid from a source substrate having one or more wells to one or more receiving substrates each having one or more wells, the apportioning system comprising in an apportioning substrate:
   (a) a first apportioning chamber having a first outlet from the apportioning substrate for delivering liquid to wells of a receiving substrate and fillable with liquid from a first well of the source substrate,
   (b) a second apportioning chamber having a second outlet from the apportioning substrate for delivering liquid to wells of receiving substrates and fillable with liquid from the first well of the source substrate,
   (c) an inlet channel for distributing the liquid from the source substrate to the first apportioning chamber and the second apportioning chamber,
   (d) a first pump for pumping liquid in the first apportioning chamber out the first outlet by means of electrodes contacting liquid distributed to the first apportioning chamber,
   (e) a second pump for pumping liquid in the second apportioning chamber out the second outlet by means of electrodes contacting liquid distributed to the second apportioning chamber,
   wherein the inlet channel distributes liquid from the source substrate to both the first apportioning chamber and the second apportioning chamber so that liquid from the inlet channel can be apportioned to the first or second outlet, and
   wherein the apportioning substrate is adapted to reversibly and sealably dock with the source substrate to join an outlet from the first well to the inlet channel and adapted to reversibly and sealably dock with receiving substrates.

2. The apportioning system of claim 1, wherein the apportioning substrate is fabricated from at least two planar substrates that are sealed together.

3. The apportioning system of claim 2, comprising a first planar substrate in which the inlet is formed and through which electrical leads to the pumps are formed.

4. The apportioning system of claim 3, comprising a second planar substrate in which the apportioning chambers are formed.

5. The apportioning system of claim 4, wherein each of the outlets from the apportionment chambers comprise a sluice formed in the lower surface of the first planar substrate and a channel formed through the second planar substrate.

6. The apportioning system of claim 2, wherein the planar substrates are formed of glass.

7. The apportioning system of claim 1, wherein, when the first apportioning chamber is filled with a selected liquid, the operation of the first pump pumps a first aliquot amount, with a reproducibility of within plus or minus about 10% of the first aliquot amount.

8. The apportioning system of claim 1, comprising at least four apportioning chambers and corresponding pumps for pumping liquids by means of electrodes.

9. The apportioning system of claim 1, comprising at least eight apportioning chambers and corresponding pumps for pumping liquids by means of electrodes.

10. An apportionment cassette comprising:
   a plurality of apportioning systems of claim 1, the apportionment cassette designed to operate with a receiving tray having a plurality of uniformly sized receiving wells formed in the upper surface of the receiving tray, wherein the density of the receiving wells is at least about 10 cells per $cm^2$,
   wherein the receiving tray and the apportioning cassette can be aligned so that the first outlets from said apportioning systems or the second outlets from said apportioning systems align with inlets of all or a subset of the wells.

11. The apportionment cassette of claim 10, further comprising a first marker on an edge of the cassette, wherein the marker is for orienting the cassette relative to the receiving tray.

12. The apportionment cassette according to claim 10, further comprising a top surface adapted to engage with an electrical housing comprising electrical circuitry for selectively operating the pumps.

13. The apportioning system of claim 1 wherein the first apportioning chamber is fillable with liquid to a first fill amount such that if liquid is added to fill the first apportioning chamber above the first fill amount, then the extra fluid drains through the first outlet.

14. The apportioning system of claim 1 wherein the second apportioning chamber is fillable with liquid to a second fill amount such that if liquid is added to fill the second apportioning chamber above the second fill amount, then the extra fluid drains through the second outlet.

15. The apportioning system of claim 1 further comprising a capillary barrier to provide impedance to fluid flow from the first apportioning chamber towards the first outlet or from the second apportioning chamber towards the second outlet.

* * * * *